(12) United States Patent
Esmaeili

(10) Patent No.: US 6,814,124 B2
(45) Date of Patent: Nov. 9, 2004

(54) OPTICAL FIBER SPLICING APPARATUS

(75) Inventor: Sasan Esmaeili, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 09/983,997

(22) Filed: Oct. 26, 2001

(65) Prior Publication Data

US 2002/0124966 A1 Sep. 12, 2002

Related U.S. Application Data

(63) Continuation of application No. PCT/SE00/00786, filed on Apr. 26, 2000.

(30) Foreign Application Priority Data

Apr. 26, 1999 (SE) ................................. 9901493

(51) Int. Cl.[7] ........................... B29C 65/02; G02B 6/255
(52) U.S. Cl. .............................. 156/502; 385/96; 65/501
(58) Field of Search .......................... 156/86, 158, 502; 65/152, 407, 501; 385/96, 135, 136, 137

(56) References Cited

U.S. PATENT DOCUMENTS

| | | | |
|---|---|---|---|
| 4,141,776 A | * | 2/1979 | Ellwood et al. |
| 4,152,190 A | * | 5/1979 | Kurosawa et al. |
| 4,274,707 A | | 6/1981 | Pacey et al. |
| 4,548,630 A | * | 10/1985 | Biedka |
| 4,589,314 A | * | 5/1986 | Ralph et al. |
| 4,736,632 A | | 4/1988 | Case |
| 5,346,521 A | * | 9/1994 | Lin |
| 6,478,481 B2 | * | 11/2002 | Uchida et al. |

FOREIGN PATENT DOCUMENTS

| | | | |
|---|---|---|---|
| EP | 887671 | * | 12/1998 |
| EP | 890852 | * | 1/1999 |
| JP | 1-254905 | * | 10/1989 |
| JP | 6-109946 | * | 4/1994 |
| JP | 8-194126 | * | 7/1996 |

* cited by examiner

*Primary Examiner*—Steven D. Maki
(74) *Attorney, Agent, or Firm*—Nixon & Vanderhye P.C.

(57) ABSTRACT

Apparatus for splicing optical ribbon fibers or ribbonized fibers has a splicing part for splicing the optical fibers to each other and a heating part or oven for heating a protective shrinkable sleeve for applying it around spliced portions of the fibers. A transport device is provided for transferring the spliced fibers from the splicing part to the heating part. The transport device includes clamps at the sides of the frame of the apparatus, which are elastically biased to give the spliced fibers a straight condition between the clamps. The transport device is manually operated by moving a handle lifting the clamps and the fibers along a slightly curved path to allow them to move unobstructed by the components of the splicing part. Thereafter a second handle is actuated to make the clamps slide along side rails having elongated holes in a straight path to a position in which the spliced portions of the fibers are located at the heating part. Using the transport device it is not necessary to manually handle the spliced fibers when moving them between the splicing location and the place for applying the protective sleeve to the splice. Furthermore, the fibers can be held with a rectilinear shape and stretched over the spliced portions which minimizes the risk of breaks of the individual optical fibers at the splice. As a result, the total time required to splice optical fibers to each other and to apply the protective sleeve can be reduced.

12 Claims, 8 Drawing Sheets

OPTICAL FIBER SPLICING APPARATUS

This application is a continuation-in-part of application Ser. No. PCT/SE00/00786, filed Apr. 26, 2000, the entire content of which is hereby incorporated by reference in this application.

TECHNICAL FIELD

The present invention relates to optical fiber splicing apparatus integrated with an oven for heating a protective sleeve placed over the bare optical fibers in a finished splice, in particular for splicing optical ribbon fibers and ribbonized optical fibers.

BACKGROUND OF THE INVENTION

In the fiber-optical communication technology to a higher and higher extent, in addition to loose or separate optical fibers, optical ribbon fibers or "ribbons" are used, i.e. optical fibers which by an outer enclosure are held to form a unit of type ribbon cable, i.e. a flat fiber assembly including a plurality of optical fibers extending in parallel to each other. Such a ribbon fiber typically contains 2, 4, 6, 8, or 12 individual fibers. Also ribbonized optical fibers are used which can be handled like ribbon fibers but which are retained at each other to form a unit in a less permanent way, see for example European patent application 00850042.3, filed Mar. 10, 2000. When splicing optical fibers and ribbon fibers often fusioning, also called welding or fusion-welding, is used in apparatus particularly designed for this purpose. When splicing two optical fibers to each other, thus the different enclosures and protective layers on the fibers are first removed. This can be made in a single step so that the naked surfaces of the optical fibers appear after the operation. Thereupon the naked fibers are cut off, are placed in the fiber splicing apparatus and are spliced to each other. Thereafter a separate protective sleeve is placed over the splicing region. Such protective sleeves are usually heat-shrinkable pieces of tubing made of a suitable polymer material. Such a piece of tubing is then placed over the spliced portions of the fibers and the protective sleeve and the spliced portions are moved to an oven, in which the protective sleeve is heated to make it shrink and tightly seal the spliced portions. The two operations, splicing using fusioning and applying the protective sleeve tightly around the spliced portions, are most often executed in two separate devices. Then, a manual displacement of the spliced fibers between these devices is used. Such a direct handling can be associated with different difficulties, in particular when moving ribbonized optical fibers, which are only kept together by adhesive tape pieces placed at a distance of each other. In addition, the non-protected spliced portions can be brittle after the splicing operation and can easily break. Therefore, a need exists for devices to facilitate the displacement of optical fibers between a splicing station and a heating station.

In U.S. Pat. No. 4,736,632 for Peter G. Case of BICC optical fiber splice mechanical testing apparatus for use with optical fiber splicing equipment is disclosed. The testing apparatus includes two clamping devices mounted on the splicing equipment located at spaced locations along the two optical fibers to be spliced, on opposite sides of the splicing position. One of the clamping devices is mounted to move towards or away from the other clamping device and is urged by a coil spring to a position remote from the splicing position. The movable clamping device can be temporarily maintained in a position nearer the splicing position when actually making the splice by operating a knob. The testing apparatus is also employed to transfer the spliced optical fibers from the splicing station to a station at which a heat-shrinkable plastics sleeve can be applied to the spliced portions of the fibers, without any manhandling of the spliced fibers by an operator. This device is not particularly suited for splicing and handling ribbon fibers and ribbonized fibers and particularly for use in splicing apparatus having a complicated design in which the simple swinging movement of the clamping devices and the held spliced fibers cannot be used.

SUMMARY OF THE INVENTION

It is an object of the invention to provide fiber splicing apparatus which includes an oven or other heating device for applying a protective sleeve around spliced fiber portions, in which the transport between the location in the apparatus where the splicing is made and the heating device can be made in a simple and secure way, in particular without any substantial risk of the occurrence of any break of the spliced fibers.

It is another object of the invention to provide a transport device for fiber splicing apparatus which can move, without the spliced fibers having to be touched by the hands of an en operator, the fibers to a heating place or other device to apply a protective sleeve.

Generally thus, splicing apparatus for optical fibers, which is particularly suited for splicing ribbonized optical fibers and also for optical fiber ribbons, has a splicing part for splicing the optical fibers to each other and a heating part or oven for heating a protective shrinkable sleeve to be fitted around the spliced portions of the optical fibers. A transport device is provided for transporting the spliced optical fibers from the splicing part to the heating part. The transport device comprises clamps at the sides of the frame of the splicing apparatus, which are elastically biased to give the spliced fibers a straight state between the clamps. The transport device is manually operated such as by a handle to lift the clamps and the optical fibers optical held thereby to be moved along a first, slightly path segment unobstructed by the different components of the splicing part. Thereafter a second handle can be operated to displace the clamps and thereby the optical fibers to move in a straight path, the clamps sliding along side rails having elongated holes, to a position having the spliced portions located at the heating part.

Owing to the path of the transport device and thus of the spliced optical fibers they do not have to be manually handled between the splicing operation and the application of a protective sleeve. Furthermore the fibers can be held having a rectilinear shape and somewhat tensioned over the spliced portions, what minimizes the risk of breaks of the individual optical fibers at the splice. Furthermore, the total time of splicing optical fibers to each other and applying a protecting sleeve can be reduced.

Thus, splicing apparatus for splicing optical fibers to each other generally comprises a splicing part having fiber guides and some fusion-splicing means for splicing optical fibers, a heating part for heating a protective sleeve placed over spliced portions of spliced optical fibers spliced to each other in the splicing part to make the protective sleeve shrink around the spliced portions tightly enclosing them, and a transport device for in a first position holding spliced fibers in a first position in the splicing part and for displacing the held optical fibers from the first position to a second position, in which spliced portions of the fibers are located at or are at least partly enclosed by the heating part, by transferring the transport device to a second position. The transport device has clamping devices to firmly hold the spliced fibers when transferring the transport device from the first to the second position.

Particularly, the transport device comprises mechanical guides to transfer the clamping devices from the first position of the transport device to the second position along a path including two substantially straight segments, a first segment and a second segment. The first and second segments meet in an angle to each other, this angle e.g. being in the range of 45–90°. Thus the path has a shape like an angle allowing the spliced fibers to be first lifted in a substantially perpendicular or vertical direction from the splicing part and then to be moved along a path from a top position in a sloping direction to the heating part. The first segment can be slightly curved such as being part of circle having a relatively large diameter in the magnitude order of the distance between the splicing and heating parts and having a center located somewhere close to the heating part. The second substantially straight segment can be completely straight.

The transport device can have side-rails at opposite sides of the splicing apparatus, which have elongated holes cooperating with the clamping devices to allow movement of the clamping devices along the second segment. The side-rails can then be rotatably mounted on the frame by bearings located at a first end of the elongated holes, the bearings corresponding to said center of the circle and placed to allow movement of the clamping devices along the first segment when rotating the side rails about the bearings. The transport device can advantageously comprise movement restricting means restricting the rotary movement of the side-rails about the bearings. The movement restricting means then may comprise a pin and a mechanical elongated guide cooperating with each other and can allow, by e.g. suitable design of the mechanical guide, the side-rails to temporarily rest in a lifted position to allow the movement along the second path.

The clamping devices are preferably elastically biased to impart, after releasing the optical fibers spliced to each other from the splicing part, a tensional force to the optical fibers to give them a substantially straight state. Locking means can cooperate with the clamping devices to hold them in inner positions, close to the splicing part, so that when opening the locking devices the clamping devices are released and move away from each other to give the fibers spliced to each other the substantially straight state. The locking means preferably comprise arms or levers having projections including engagement surfaces cooperating with surfaces of the clamping devices, the levers being mounted to rotate in planes substantially perpendicular to the longitudinal direction of spliced optical fibers held by the clamping devices and the engagement surfaces being located in relatively small angles, such as in the range of 2–15°, to the planes to allow, when rotating the levers when opening the locking devices, the clamping devices to move gradually away from each other, thereby avoiding a sudden increase of tensional force on the spliced optical fibers and possible breaks caused thereby.

BRIEF DESCRIPTION OF THE DRAWINGS

The invention will now be described as an non-limiting embodiment with reference to the accompanying drawings in which:

FIGS. 6 and 7, FIGS. 9 and 10 are views corresponding to the views of FIGS. 2 and 3 and show the apparatus after the retained fibers have been brought to a position in which the spliced region can be introduced in or be enclosed by an oven.

PREFERRED EMBODIMENT

Figure 1:
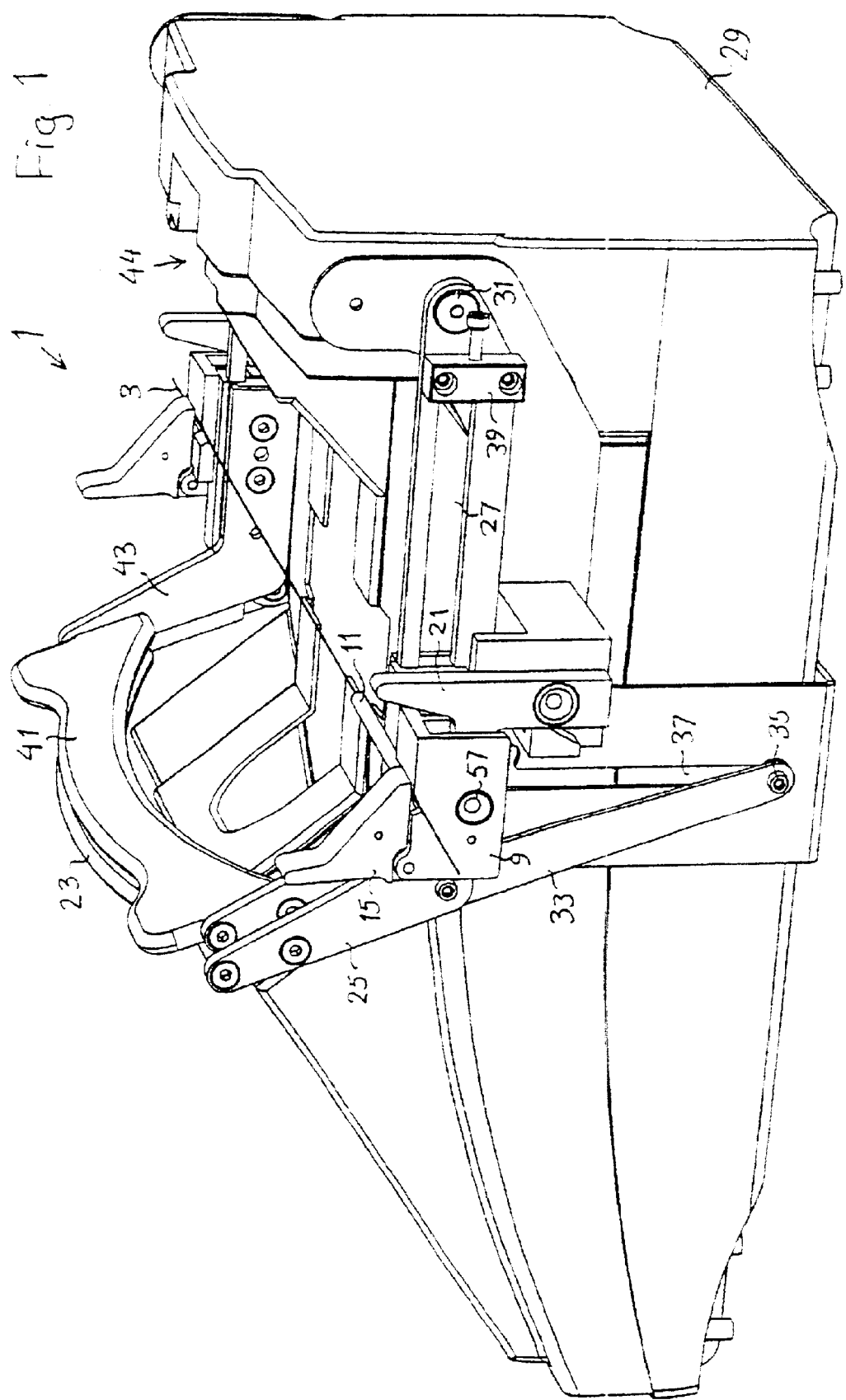
FIG. 1 is a perspective view seen obliquely from the side and from the rear of fiber splicing apparatus comprising a heating oven for a protective sleeve and a transport device for transporting fibers placed therein between a splicing position and a heating position, the apparatus being in a position for splicing and directly after the splicing, the fibers shown, however, in this view to take a straight condition past a splicing part, which together with a lid of the oven is not visible.
Figure 2:
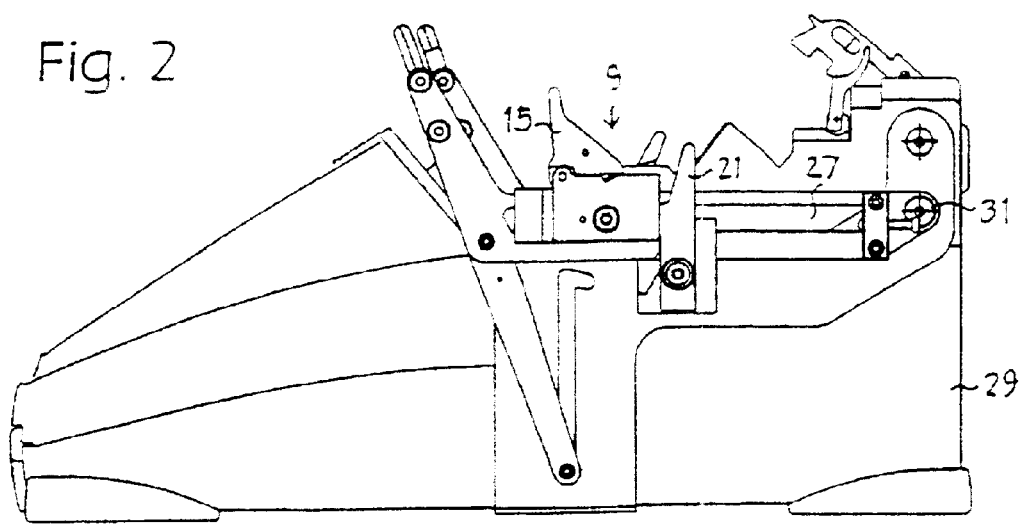
FIGS. 2 and 3 are a view from above and a view from the side respectively of the fiber splicing device of FIG. 1 in the same position.
Figure 3:
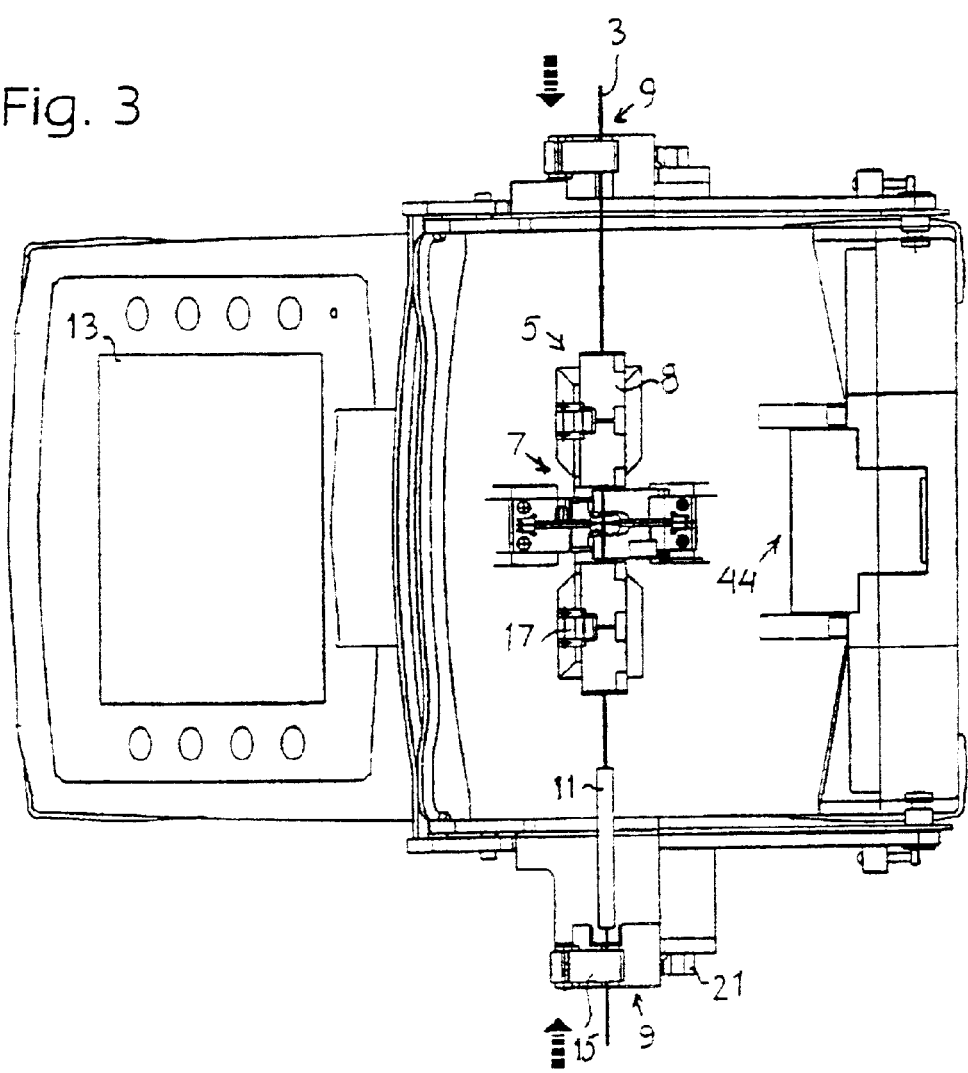
Figure 4:
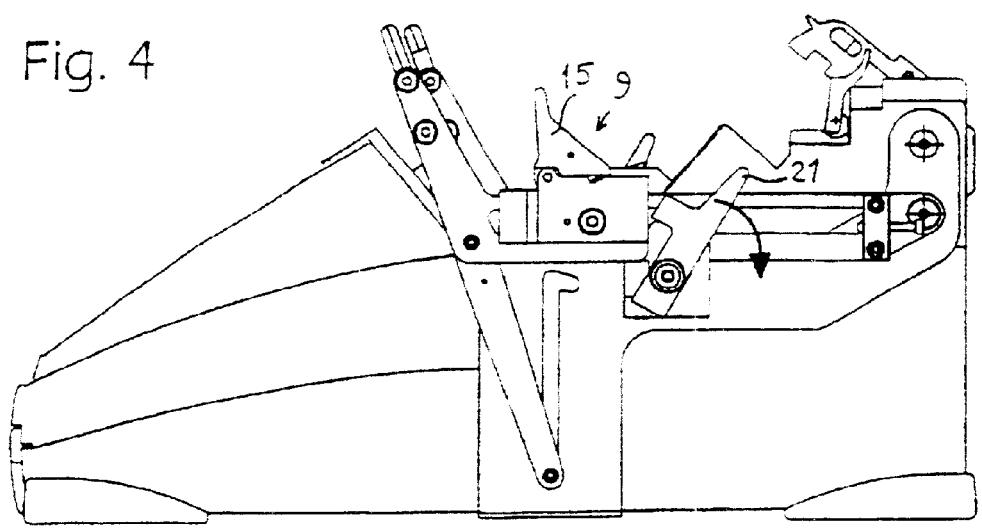
FIGS. 4 and 5 are views corresponding to the views of FIGS. 2 and 3, but showing the apparatus in a position after splicing, when the spliced fibers have been released from fiber splicing retainers and arms have been actuated to stretch the spliced fibers to a substantially rectilinear configuration.

In FIGS. 1, 2 and 3 fiber splicing apparatus 1 is shown in its position at and directly after splicing two ribbonized fiber assemblies or optical ribbon fibers 3 to each other, hereinafter only called ribbon fibers. The two ribbon fibers are retained or held at places close to their ends at which the splicing is made, by fiber retainers 5 visible in the view from above in FIG. 2. The fiber retainers 5 can be the type disclosed in the published European patent application 0 887 671. Between the fiber retainers 5 is the splicing location 7 located, see FIG. 3, where fiber guides and electrodes, not shown, are arranged, for example in the way disclosed in the published European patent application 0 890 852. The fiber retainers 5 are, as disclosed in the last cited European patent application, arranged on sloping planes, so that the individual fibers in the ribbon fibers by the slope are pressed against horizontally arranged grooves close to the very splicing location. At either side of the fiber retainers 5 the two ribbon fibers 3 pass over the lower clamping surfaces of outer clamping devices or clamps 9, which are placed at the sides of the apparatus at a distance of the fiber retainers 5. Between one clamp 9 and the fiber retainer 5 located most adjacent thereto a piece of non-shrunk protective hose 11 is placed around the piece of the optical ribbon fiber located therebetween. Observe that the ribbon fibers actually do not take the position shown in FIG. 1 but have a state somewhat sloping state downwards from each clamping device 9 up to the adjacent fiber retainer 5 and pass horizontally between the fiber retainers.

The splicing apparatus 3 furthermore includes a monitor 13, which is connected to optical devices, not shown, for displaying the splicing location, see also the last cited European patent application.

Figure 5:
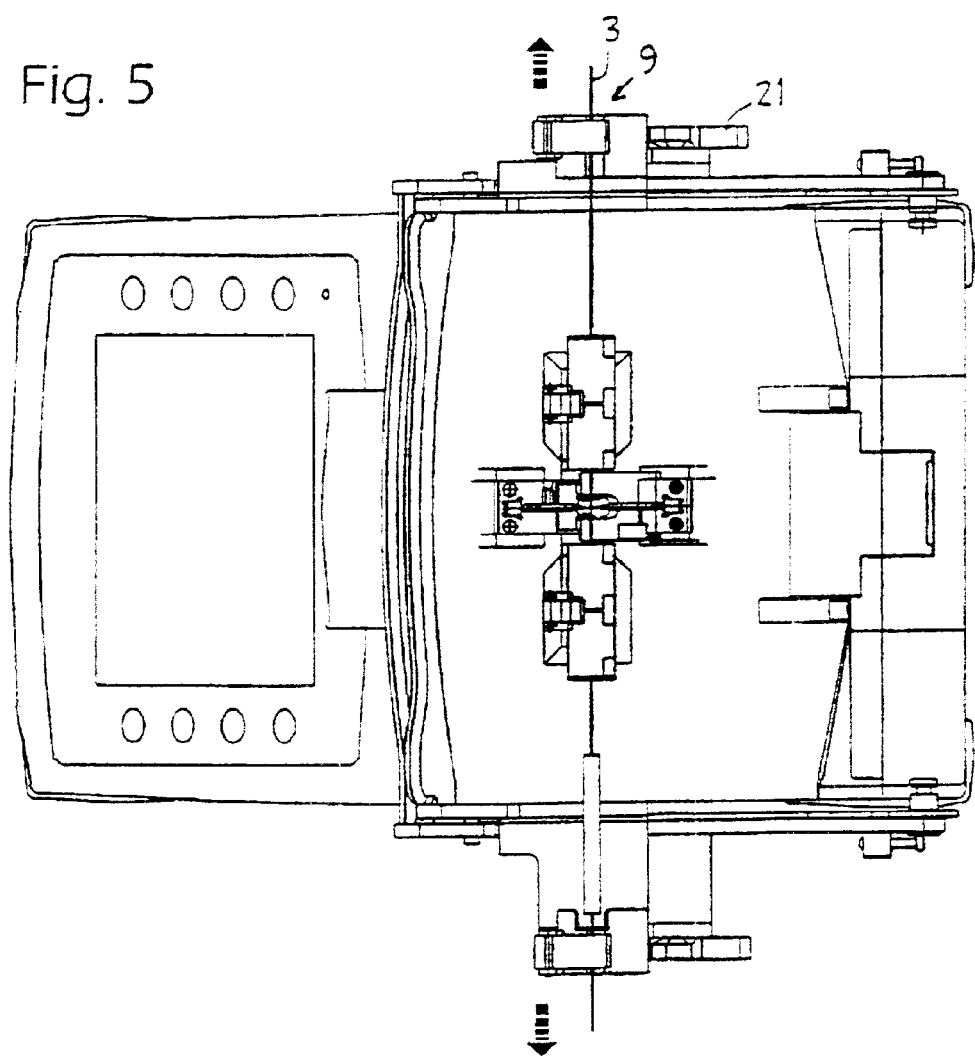

When the splice is being made or latest when it has been ended, clamping shoes 15 of the clamping devices 9 are folded down, so that each ribbon fiber 3 is securely held thereby. The clamping shoes can for example be maintained in their folded-down, closed position by suitably arranged springs, not shown. Then, locking arms or levers 21 are operated to move from the position shown in FIGS. 1–3 to the open position visible in FIGS. 4–12. Then, the outer clamps 9 are elastically displaced in directions away from each other, see the arrows in FIG. 5, by suitably arranged springs, so that a tensional force is imparted to the pieces of the two optical ribbon fibers 3 held between these clamps 9 and the retainers 5 urging them to take a straight state. Thereafter the ribbon fibers 3 can be released from the retainers 5. The divided lids 8 thereof are folded up as visible in FIG. 7. The lower part of the fiber retainers 5 can remain in their position, by being retained by central clamps 17 and the lids 8 having corresponding recesses in the way disclosed in the European patent application first cited above. After folding the lids up the ribbon fibers will thus be stretched to take a straight state between the clamps 9 due to the elastic biasing of the clamps as seen in FIG. 1.

Figure 6:
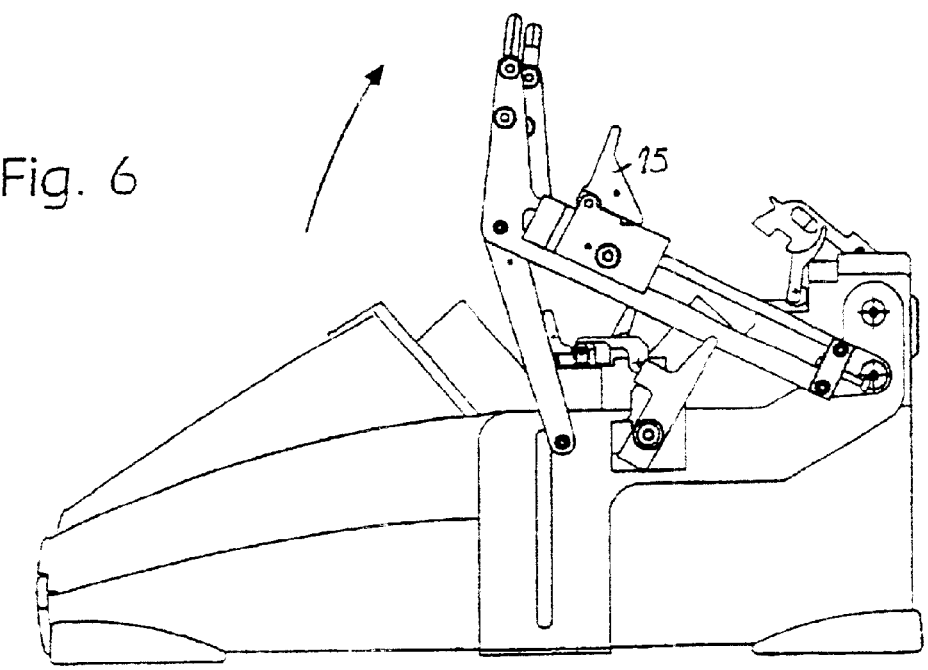
FIGS. 6 and 7 are views corresponding to the views of FIGS. 2 and 3 after the fiber transport device has lifted the clamped fibers over the splicing position in the apparatus.
Figure 7:
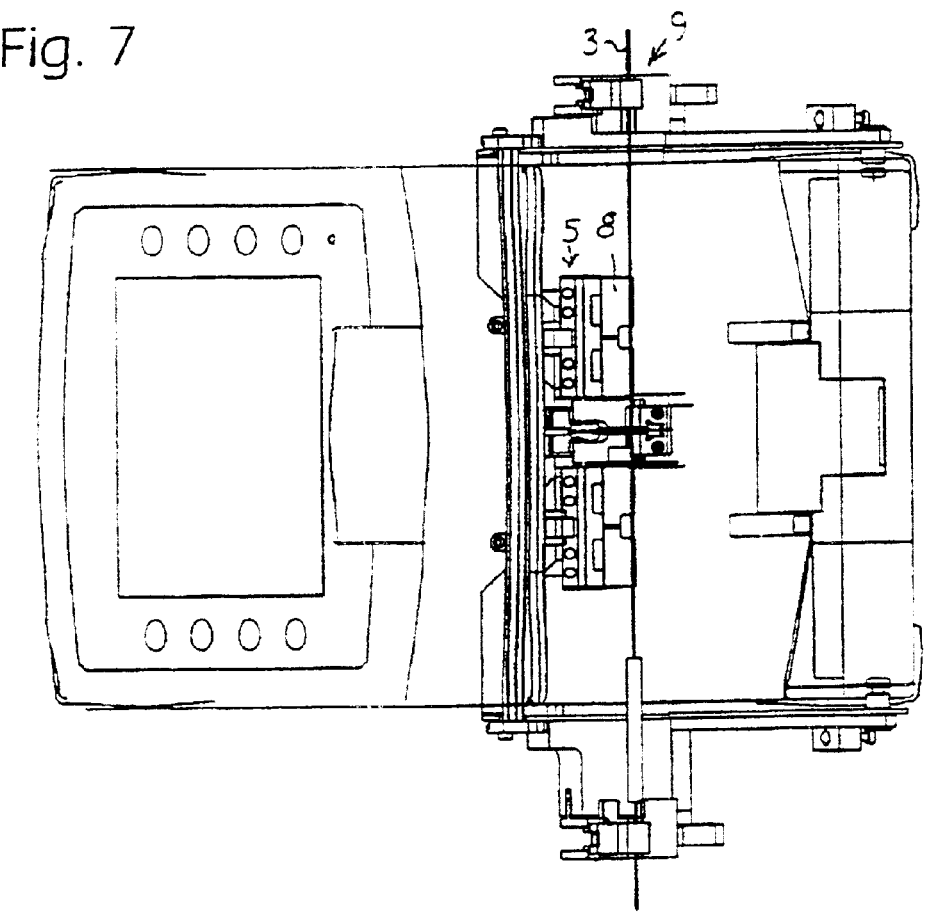
Figure 8:
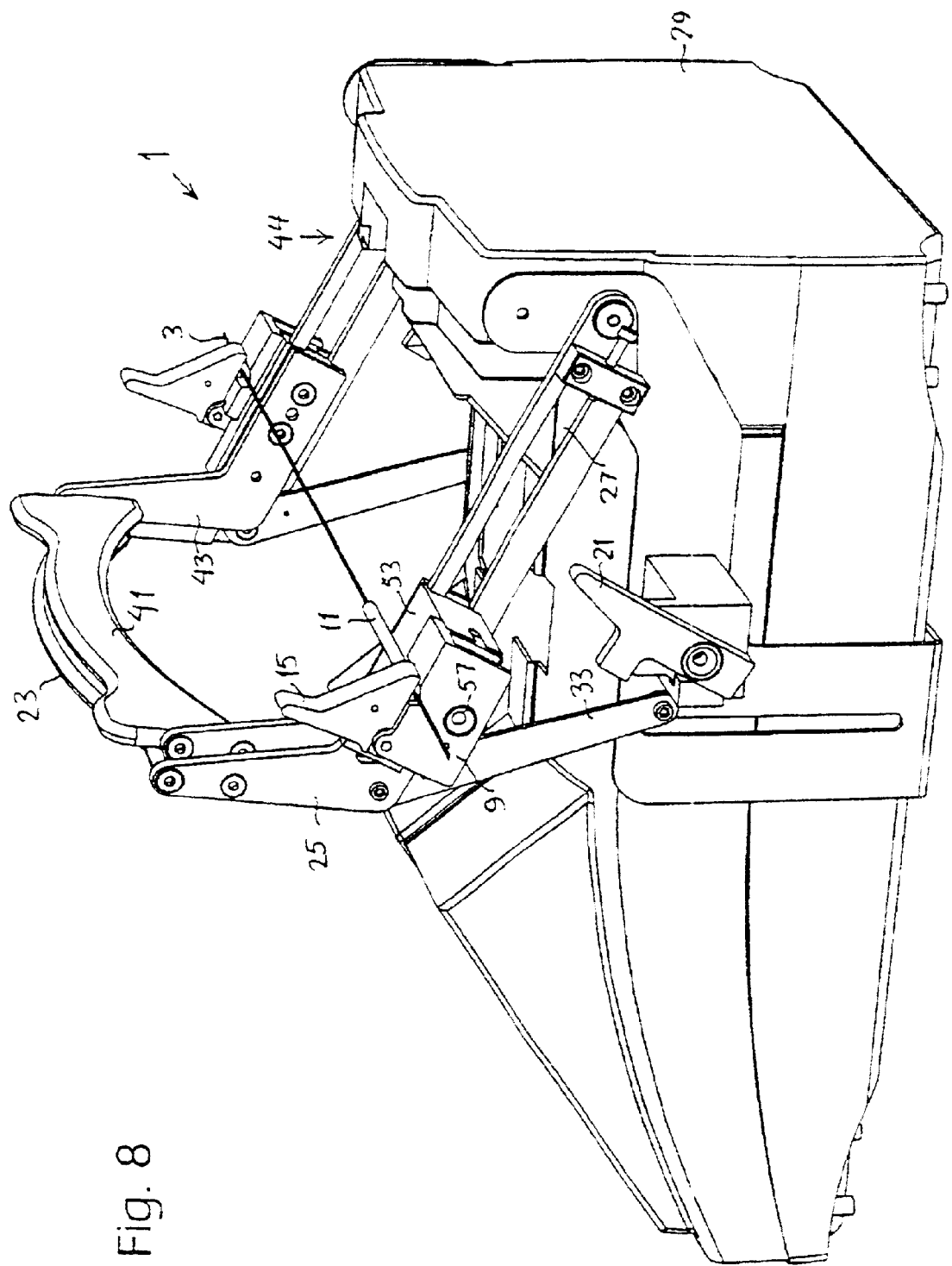
FIG. 8 is a perspective view corresponding to the view of FIG. 1 and shows the apparatus in the same state as in i
Figure 9:
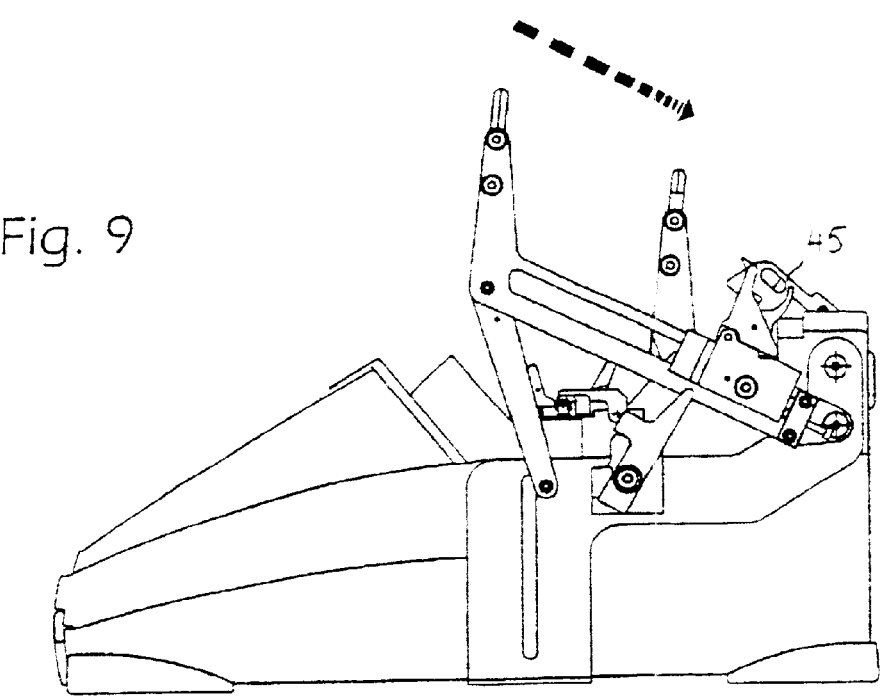
Figure 10:
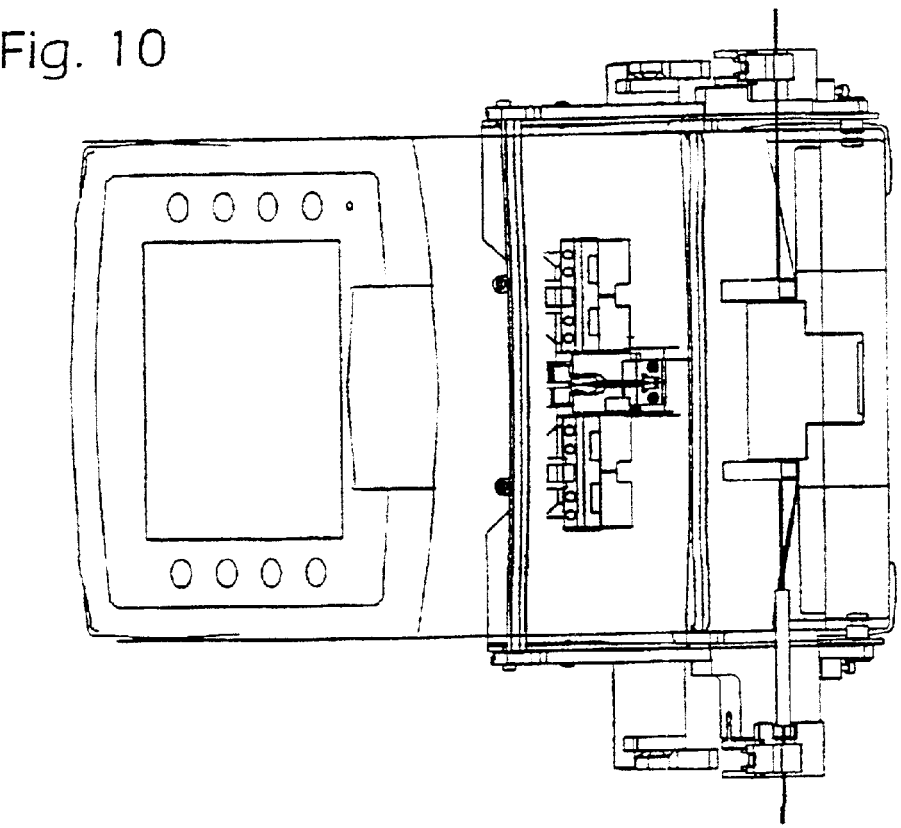
Figure 11:
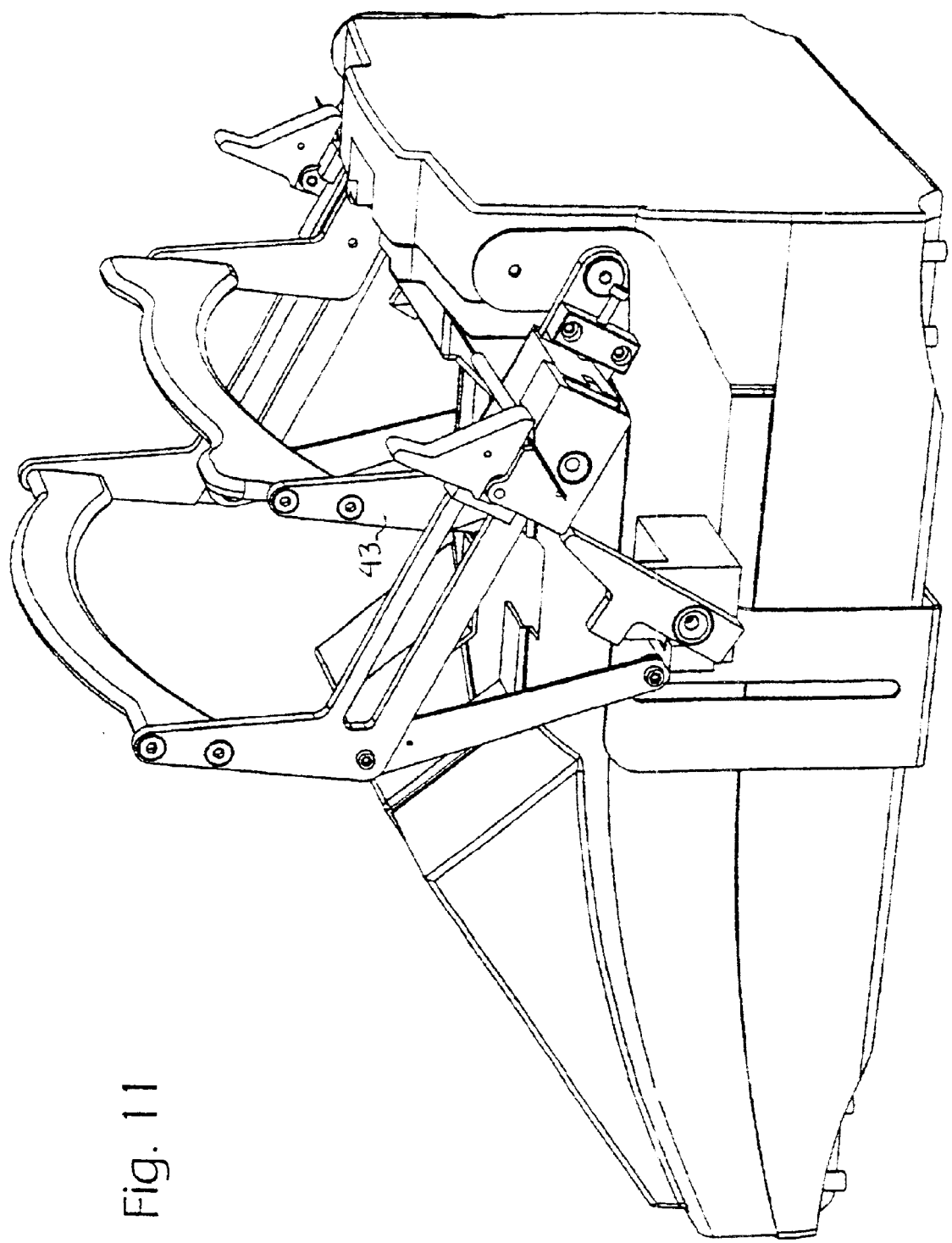
FIG. 11 is a perspective view corresponding to the view of FIG. 1 and shows the apparatus in the same state as in FIGS. 9 and 10.

The outer clamps 9 and thereby the spliced ribbon fibers having a straight state between the clamps are then moved upwards as shown in FIGS. 6–8. It is made by manually lifting a handle 23 connecting two side rails 25 to each other. The side rails 25 have a longer portion in which elongated holes 27 are provided and along which the clamps 9 are movable cooperating with the elongated holes 27. The side rails 25 have also portions projecting obliquely from the longer portions to which the handle 23 is attached. The side rails 25 are at the other ends of the longer portions rotatably mounted in the frame 29 of the splicing apparatus by bearings 31. When lifting the handle 23 also short rods 33 accompany the movement. The rods 33 are articulated at their upper ends at the angle of the side rails 25 in the area in which the longer portions provided with holes connect to the short portions located in an angle. The rods 33 have at their lower ends pins 35, which pass in grooves 37 in the sides of the frame of the splicing apparatus. These grooves 37 have a longer main portion extending vertically and a short portion sloping a little downwards from the horizontal position and connecting to the top part of the vertical main portion. When thus the handle 23 has been sufficiently lifted, the pins 35 are moved, because the grooves at their topmost part have upper, suitably curved groove walls, by this curvature into the upper groove portions sloping a little downwards so that the side rails 25 will then rest, supported by the rods 33, in the lifted position. In this lifted position the optical ribbon fibers 3 and the clamping devices 9 can move freely not being obstructed by the locking rods 21 and by the fiber retainers 5 at the splicing location.

The clamps 9 are then made to slide along the elongated holes 27 in the side rails 25 until they will be engaged with stop heels 39. This displacement is produced by manually actuating another handle 41, which has previously been placed close to the lifting handle 23. The displacement handle 41 is attached to side pieces 43, which in turn are attached to the clamps 9, suitably by devices passing through the elongated holes 27. In the position obtained by moving the displacement handle away from the position used for splicing, the ribbon fiber 3 together with its spliced portion will be located in a region 44 in which a heating can be produced. To apply mechanical protection to the finished splice, the protective sleeve 11 is then displaced to a position centrally over the spliced portions. This displacement of the protective sleeve can instead advantageously be made in the lifted position shown in FIGS. 6–8. Then a lid 45 is lowered to thereby enclose the ribbon fibers 3. In the lowering of the lid 45 the heating can be automatically started to continue for a time period necessary to make the shrinkable sleeve 11 retract and be tightly placed over the portions of the ribbon fibers 3 which have no protective layer.

When the heating is finished, the lid 45 is lifted, the clamping shoes 15 are released by manual operation thereof and the spliced ribbon fibers can be taken out of the splicing apparatus.

Figure 12:
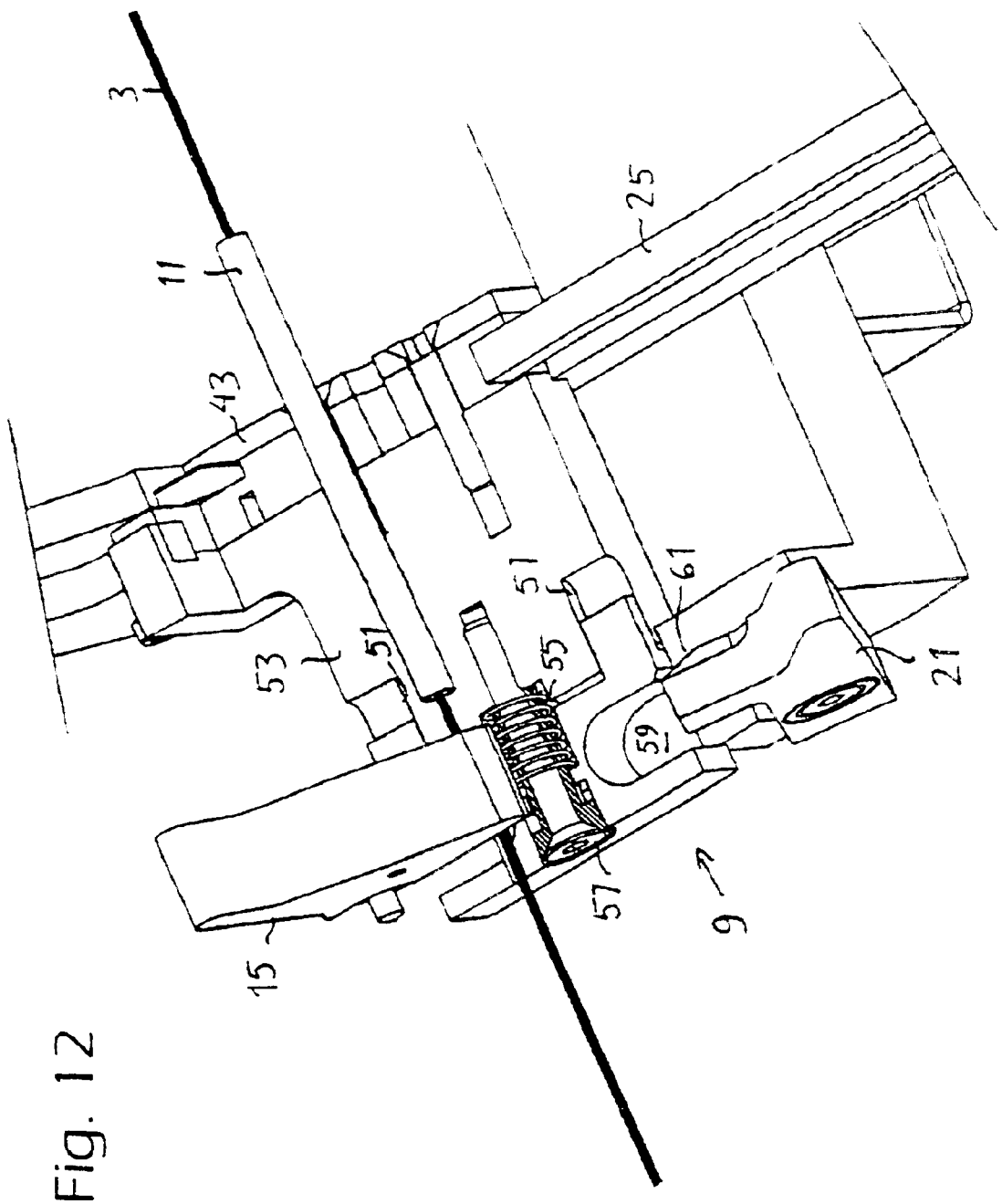
FIG. 12 is a perspective view of a section taken through an outer clamping device.

In FIG. 12 a section taken through the right outer clamping device 9 is shown. In the figure is visible how the clamping device 9 is laterally slidably along sliding surfaces 51 of a support part 53, which in turn is slidable along the elongated holes 27 of the side rails 25 and is attached to the inner side pieces 43. The clamping device 9 is urged to an outer position by a helical spring 55 mounted around a pin 57. The pin 57 has a suitable step cooperating with a corresponding recess in the clamping device 9 to limit the movement of the clamp 9 away from the support part 53. Furthermore, here is also visible how the locking lever 21 cooperates with a recess 59 in the clamp 9. The locking rod 21 has on its locking side an obliquely extending surface 61, located in a small angle to a plane perpendicular to the longitudinal direction of the spliced fibers. When the locking lever is moved to an unlocked position by rotating it about a bearing placed at its lower end as shown in FIG. 12, owing to the sloping surface 61, the clamp 9 will by the action of the spring 55 be gradually moved to stretch the spliced optical ribbon fibers 3 between the fiber retainers 5 and the clamping devices 9.

What is claimed is:

1. Splicing apparatus for splicing optical fibers to each other, the apparatus comprising:
   a splicing part having fiber guides and fusion-splicing means for splicing optical fibers,
   a heating part for heating a protective sleeve placed over spliced portions of spliced optical fibers spliced to each other in the splicing part to make the protective sleeve shrink around the spliced portions tightly enclosing them, and
   a transport device for in a first position holding optical fibers that are being spliced or have been spliced to each other in a first position in the splicing part and for displacing the held optical fibers from the first position to a second position with spliced portions of the optical fibers located at or at least partly enclosed by the heating part by transferring the transport device to a second position, the transport device comprising clamping devices to firmly hold the optical fibers spliced to each other when transferring the transport device from the first to the second position,
   wherein the transport device comprises mechanical guides to transfer the clamping devices from the first position of the transport device to the second position along a path including a first segment and a second, substantially straight segment, the first and second segments meeting in an angle to each other.

2. Splicing apparatus according to claim 1, wherein the first segment is part of circle having a relatively large diameter.

3. Splicing apparatus according to claim 1, wherein the second substantially straight segment is completely straight.

4. Splicing apparatus according to claim 1, wherein the transport device comprises side-rails at opposite sides of a frame of the splicing apparatus, the side-rails having elongated holes cooperating with the clamping devices to allow movement of the clamping devices along the second segment.

5. Splicing apparatus according to claim 4, wherein the side-rails are rotatably mounted on the frame by bearings located at a first end of the elongated holes, the bearings being placed to allow movement of the clamping devices along the first segment when rotating the side rails about the bearings.

6. Splicing apparatus according to claim 5 wherein the transport device comprises a movement restricter for restricting the rotary movement of the side-rails about the bearings.

7. Splicing apparatus according to claim 6, wherein the movement restricter comprises a pin and a mechanical elongated guide cooperating with each other.

8. Splicing apparatus according to claim 1, wherein the clamping devices are elastically biassed to impart, after releasing the optical fibers spliced to each other from the splicing part, a tensional force to the optical fibers to give them a substantially straight state.

9. Splicing apparatus according to claim 8, further comprising:
a lock cooperating with the clamping devices to hold them in inner positions, close to the splicing part, so that when opening the locking devices the clamping devices are released and move away from each other to give the fibers spliced to each other the substantially straight state.

10. Splicing apparatus according to claim 9, wherein the lock comprises levers having projections including engagement surfaces cooperating with surfaces of the clamping devices, the levers being mounted to rotate in planes substantially perpendicular to the longitudinal direction of spliced optical fibers held by the clamping devices, the engagement surfaces being located in relatively small angles to the planes to allow, when rotating the levers in opening the locking devices, the clamping devices to move gradually away from each other, thereby avoiding a sudden increase of tensional force on the spliced optical fibers.

11. Splicing apparatus according to claim 1, wherein the angle is in the range of 45°–90°.

12. Splicing apparatus for splicing optical fibers to each other, the apparatus comprising:

a splicing part having fiber guides and a fusion-splicer for splicing optical fibers, a heating part for heating a protective sleeve placed over spliced portions of spliced optical fibers spliced to each other in the splicing part to make the protective sleeve shrink around the spliced portions tightly enclosing them, and a transport device for in a first position holding optical fibers that are being spliced or have been spliced to each other in a first position in the splicing part and for displacing the held optical fibers from the first position to a second position with spliced portions of the optical fibers located at or at least partly enclosed by the heating part by transferring the transport device to a second position, the transport device comprising clamping devices to firmly hold the optical fibers spliced to each other when transferring the transport device from the first to the second position, wherein the clamping devices are elastically biassed to impart, after releasing the optical fibers spliced to each other from the splicing part, a tensional force to the optical fibers to give them a substantially straight state, the transport device further comprising a lock cooperating with the clamping devices to hold them in inner positions, close to the splicing part, so that when opening the locking devices, the clamping devices are released and move away from each other to give the fibers spliced to each other the substantially straight state, and the lock comprising levers having projections including engagement surfaces cooperating with surfaces of the clamping devices, the levers being mounted to rotate in planes substantially perpendicular to the longitudinal direction of spliced optical fibers held by the clamping devices, the engagement surfaces being located in relatively small angles to the planes to allow, when rotating the levers in opening the locking devices, the clamping devices to move gradually away from each other, thereby avoiding a sudden increase of tensional force on the spliced optical fibers.

* * * * *